US010866942B1

(12) United States Patent
Russakovsky

(10) Patent No.: US 10,866,942 B1
(45) Date of Patent: Dec. 15, 2020

(54) CASCADED INDEXING OF MULTIDIMENSIONAL DATA

(71) Applicant: Alexander Russakovsky, Palo Alto, CA (US)

(72) Inventor: Alexander Russakovsky, Palo Alto, CA (US)

(73) Assignee: ZEEPABYTE, INC, Palo Alto, CA (US)

( * ) Notice: Subject to any disclaimer, the term of this patent is extended or adjusted under 35 U.S.C. 154(b) by 188 days.

(21) Appl. No.: 16/159,626

(22) Filed: Oct. 13, 2018

Related U.S. Application Data

(66) Substitute for application No. 15/133,221, filed on Apr. 20, 2016, now abandoned.

(60) Provisional application No. 62/149,645, filed on Apr. 19, 2015.

(51) Int. Cl.
*G06F 17/00* (2019.01)
*G06F 16/22* (2019.01)
*G06F 16/27* (2019.01)
*G06F 16/2457* (2019.01)

(52) U.S. Cl.
CPC ...... *G06F 16/2264* (2019.01); *G06F 16/2246* (2019.01); *G06F 16/2457* (2019.01); *G06F 16/278* (2019.01)

(58) Field of Classification Search
CPC ............ G06F 16/2264; G06F 16/2457; G06F 16/2246; G06F 16/278
See application file for complete search history.

(56) References Cited

U.S. PATENT DOCUMENTS

| | | | |
|---|---|---|---|
| 6,182,063 B1* | 1/2001 | Woods | G06F 16/30 707/722 |
| 2003/0004938 A1* | 1/2003 | Lawder | G06F 16/2264 |
| 2005/0038798 A1* | 2/2005 | Sample | G06F 16/322 |
| 2005/0120020 A1* | 6/2005 | Carus | G06F 7/00 |
| 2016/0154890 A1* | 6/2016 | Nishimura | G06F 16/283 707/770 |

* cited by examiner

*Primary Examiner* — Greta L Robinson

(57) ABSTRACT

The present invention extends to methods, systems, devices, and computer program products that advantageously provide for indexing composite keys (i.e., keys for space-filling curve) of multidimensional data storages into the form of an affixation tree or trie. More specifically, example embodiments provide for the organization or indexing of records of multidimensional data into instances (or partitions) of a "cascade" data structure augmented by a key affixation—i.e., a predetermined series or string of bits or bytes that appear before, after, and/or within a designated bit stream or composite key.

17 Claims, 6 Drawing Sheets example of z-curve another z-curve example

CASCADED INDEXING OF MULTIDIMENSIONAL DATA

CROSS-REFERENCE TO RELATED APPLICATIONS

This application substitutes abandoned U.S. patent application Ser. No. 15/133,221, filed Apr. 20, 2016.

TECHNICAL FIELD

Embodiments of the present invention generally relate to the storage and selective retrieval of multidimensional data typically used in large or big data analytics on a distributed or non-distributed database system; and more particularly to systems, methods, devices, and computer program products for quickly loading and/or searching data in distributed and similar databases.

BACKGROUND

Multidimensional databases are used in high volume data warehouses for dealing with analytic tasks, such as queries, interactive data exploration, data mining, predictive analytics, and other tasks associated with large or "big data" storage systems. They typically provide greater flexibility and better performance than traditional "Relational" databases. In many cases the data warehouses contain trillions of records; hence the name large data, while scalability and performance remain of critical importance for performing the above mentioned tasks. As a consequence of these competing interests of size versus scalability/performance, databases face ever-growing challenges, especially in ad-hoc query workloads, which exclude any ability to organize data in query-specific way.

Note that "multidimensional" as used herein describes the nature of the data (i.e., a record of data consisting of values of multiple attributes) rather than the database itself (i.e., a "multidimensional database"). Thus, the word "multidimensional" applies to a wide class of databases or distributed data storage systems. Similarly, the term "multidimensional" as it applies to data can apply to any data with more than one column in a table. As such, "multidimensional data" as used herein simply means data with attributes that can be stored in two or more columns (or rows).

According to industry standards, one typically converts multidimensional data into key-value format using composite keys derived from certain attributes (i.e., dimensions) and values as a vector of instances of other attributes (i.e., measures). Queries with filters on dimensions then translate into pattern search problems (PSP) on these composite keys. To date, numerous processes have been proposed for organizing (e.g., indexing) data with respect to composite keys—such as: (a) using multidimensional indices of various kinds based on values of dimensions; or (b) based on linearizing the multidimensional space using space-filling curves. The former suffers from favoring one or two dimensions at the expense of the rest; the latter requires ordering by composite key, which results in additional time to organize and/or build the index. Moreover, both techniques suffer from uneven distribution of data across nodes in distributed environments, which also negatively affects performance. Accordingly, what is needed is a mechanism for indexing composite keys in a flexible, scalable, and efficient manner that also allows for a more even distribution of data across nodes in a distributed system.

BRIEF SUMMARY

Example embodiments described herein provide methods, systems, apparatuses and computer program products that advantageously index composite keys (i.e., keys for space-filling curve) of multidimensional data storages into the form of an affixation tree or trie. More specifically, example embodiments provide for organizing or indexing records of multidimensional data into instances (or partitions) of a "cascade" data structure augmented by a key affixation—i.e., a predetermined series or string of bits or bytes that appear before, after, and/or within a designated bit stream or composite key.

In brief, a "cascade", in accordance with exemplary embodiments described herein, interprets data as multidimensional data, identifies certain portions of a space for multidimensional data, which includes a domain or subspace for which a space-filling curve enters and exits one time ("fundamental domains"), and clusters together (without regard to order) points from the same fundamental domain. Each such domain is uniquely described by a corresponding affixation (e.g., prefix) of the node(s) or point(s) along the curve up to a certain or predetermined length. In other words, a "cascade", as used in accordance with exemplary embodiments, organizes or indexes points of a space-filling curve according to their key affixes (e.g., prefixes). For each new affixation (e.g., prefix), initially, "flat" storage space is allocated, with a certain specified capacity.

An exemplary process for searching in a database may include receiving a message indicating a query with a filter, where such query comprises a certain predicate (e.g., Boolean expression) and asks for records satisfying that predicate. The predicate may then be converted into a pattern to search for in the keys within the database. Note that the searching for such keys may be performed in a parallel or sequential manner, within each partition representing an instance of a cascade data structure containing appropriately encoded data. Next, the process compares appropriate parts of the query pattern to affixes (e.g., prefixes) within the cascade, and may limit subsequent searching to sub-cascades whose affixes (e.g., prefixes) match the mentioned parts of the query pattern. The process further includes scanning, in parallel or sequential manner, the underlying flat storage for matching the remainder of the pattern. Once matches are found, key-value pairs are formed as specified in the query using cross-reference between selected keys and values. Next, the merging or aggregating key-value pairs selected within each partition and conversion of those key-value pairs into original data values (i.e., decoding) may be performed; such that the obtained query result can be transmitted back to the user.

Decoding and encoding for each attribute can be handled by means of dictionaries or transformations or by any other means. Forming composite keys from encoded values of attributes can be done in accordance with a space-filling curve or in any other way allowing to transform query filters into pattern search problems. Decoding and encoding can be performed by a separate computer, which may be beneficial for data security purposes as the encoded data is not human readable without the dictionary but is sufficient for loading and searching tasks as described above.

The foregoing outlines rather broadly the features of an embodiment of the present invention, so that the following detailed description of the invention could be better understood. Additional features and advantages of embodiments of the invention will be described hereinafter and will form the subject of the claims of the invention. The concepts and specific embodiments disclosed here may be readily utilized as a basis for designing or modifying other structures or processes for carrying out the same purposes as this invention. It should be realized by those skilled in the art that equivalent constructions do not depart from the essence, spirit and scope of the present invention as set forth in the claims.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
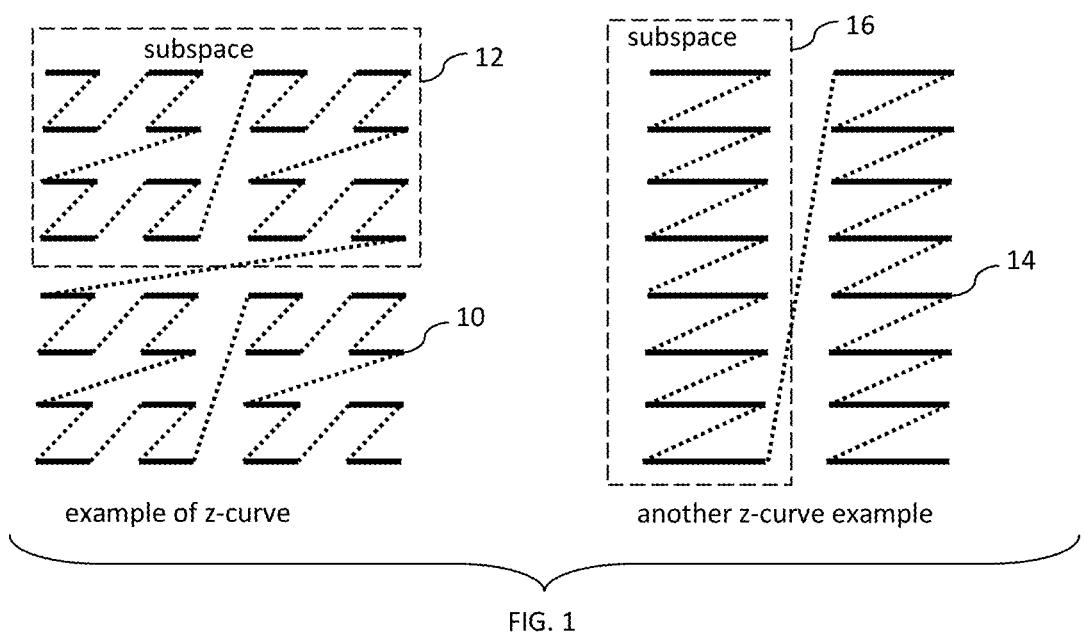
FIG. 1 illustrates a z-curve and subspace concept in accordance with exemplary embodiments described herein.

The present invention extends to methods, systems, devices, and computer program products that advantageously provide for indexing composite keys (i.e., keys for space-filling curve) of multidimensional data storages into the form of an affixation tree or trie. More specifically, example embodiments provide for the organization or indexing of records of multidimensional data into instances (or partitions) of a "cascade" data structure augmented by a key affixation—i.e., a predetermined series or string of bits or bytes that appear before, after, and/or within a designated bit stream or composite key.

Although an illustrative implementation of the embodiments is provided below, it should be understood that the disclosed system and methods may be implemented using any other techniques, whether currently known or existing. The disclosure is in no way limited to the techniques, drawings and implementations illustrated below, but may be modified within the scope of the below appended claims along with their entire scope of equivalents.

An ad-hoc query, as it relates to online analytic processing (OLAP) applications, is a query with a combination of various filters on some of the attributes of factual data. Such queries optionally require some attribute values to be aggregated. Each given query may be efficiently prepared for by using a dedicated index. However the number of such indices even for a moderate number of attributes, due to combinatorics, is so huge that complete indexing is intractable. This is referred to as the "dimensional explosion" phenomenon.

Further, in the history of multidimensional databases, many similar or other forms of multidimensional indices have been proposed for various explicit or implicit space-filling curves (described below), such as kd-trees, R-trees, UB-trees, etc. Although some of these may be efficient for search problems driven by specific applications; all of them suffer from various limitations including: complexity in form and implementation; limited performance; instability issues under updates; favoring of some attributes at the expense of other ones, etc.

Example embodiments described herein solve the above noted and other limitations of indexing for space-filling curves by organizing data records—after conversion to key-value pair form—into a sufficient number of instances (or, partitions) of "cascade" data structures—which is a kind of affix or affixation tree or trie, described below in greater detail. As used herein, affixes or affixations are a series or sequence of bits or bytes depending on their position with reference to a stem, remainder or remaining portion of an overall bit stream, subspace, or composite key. For example, a "prefix" is an affixation that appears before the stem portion of a designated bit stream or composite key; while a "suffix" is an affixation that appears after the stem or remaining portion. Similarly, an "infix" may appear within composite key or subspace (e.g., in the middle); while a "circumfix" generally means one portion of the affixes appears before the stem or remainder portion, and the other after it.

In other words, an affix or affixation is a predetermined series or string of bits or bytes that appear before, after, and/or within a designated bit stream subspace, and/or composite key. Anything remaining after the removal of an affixes or affixation is generally referred herein as the stem, remainder, or remaining portion of the bit stream or composite key. Further, the stem or remaining portion itself may also include cascaded affixes or affixations; and thus, once the extraction of the affixation occurs, the stem may become a new bit stream or subspace series with an affixation (e.g., prefix) and a remaining or stem portion (e.g., suffix). Similarly, the remaining portion after one affixation extraction (e.g., a prefix) may also be described in terms of it's complimentary affixation (e.g., the suffix, in this case). As such, the above terms and use of the terms affix, affixes, affixation, complementary affix, complementary affixes, complementary affixation, stem, remainder, remaining portion, and the like, should be given a very general and broad interpretation and may be interchangeable depending on their usage unless otherwise specifically stated or claimed. Likewise, the use of a specific affixes (e.g., a "prefix") in accordance with exemplary embodiments described herein may be interchangeably used with a complimentary (e.g., "suffix") or other affixations. As such, unless otherwise specifically claimed, the use of specific affixes described herein in accordance with any example or exemplary embodiment is for illustrative purposes only and is not meant to limit or otherwise narrow or restrict the scope of the present invention to any such specific use.

In brief, a "cascade", in accordance with exemplary embodiments described herein, identifies certain portions of a space for multidimensional data, which includes a domain or subspace for which a space-filling curve enters and exits one time ("fundamental domains"), and clusters together (without regard to order) points from the same fundamental domain. Each such domain is uniquely described by a corresponding affixation (e.g., prefix) of the node(s) or point(s) along the curve up to a certain or predetermined length. In other words, a "cascade", as used in accordance with exemplary embodiments, organizes or indexes points of a space-filling curve according to their key affixes (e.g., prefixes). For each new affixation (e.g., prefix), initially, "flat" storage space is allocated, with a certain specified capacity.

Generally, the noted "flat" storage space contains affix compliments (e.g., suffices for a prefix) of the inserted keys. When capacity of flat storage is exceeded, flat storage is restructured into a sub-cascade, resulting in further truncation of stored complementary affixations (e.g., suffixes). The leaf node of each cascade (viewed as an affix tree) may also be organized as flat storage. Thus, by virtue of cascade properties, flat storage includes a determinable number of key complementary affixes (e.g., suffixes). For each partition, the value parts of the key-value pairs are cross-referenced with the keys and are stored in a separate structure. Such separate structure may take a similar or different form than that of the flat storage space, may be clustered by attribute (e.g., columnar storage), or kept in some other order. As used herein, cross-reference means the ability to locate or identify which key and value originate from the same key-value pair.

In another example embodiment, partitions can be persisted on a storage device or remain in memory. Cascades of keys could be stored on faster media than the values, for example, memory versus storage device, fast storage device versus slow storage device (such as flash memory versus rotational disk), etc. For persistence purposes, flat storage may be subdivided into pages of smaller size. The page size could be chosen so that pages fit into processor cache, or so that reads or writes of a page are optimized for performance. Such paging techniques may comply or follow well-known industry standards for databases and other applications.

In case of multiple nodes (i.e., clustered database), example embodiments allow cascade instances to be created on each node, and a given record may be sent to a node either in a round-robin fashion or according to some other well=known mechanism (for example, based on the hash code of the record). A primary consideration in this distribution is "balancing", i.e., maintaining approximately equal number of records per partition.

In accordance with yet other exemplary embodiments, a process for loading data into a "cascade" data structure may include receiving a message or request indicating load of a single record or a batch of records. Once the record(s) are received, each record is then encoded (or otherwise converted) into a key-value pair consisting of (composite) key and (vector) value. Each key-value pair may then be placed into a partition or subspace of a cascade data structure.

More specifically, the placement of each key-value pair into the cascaded partitions or subspaces may include comparing appropriate parts (i.e., binary digits or bits) of a composite key with the affixes (e.g., prefixes) already accounted for in the cascade data structure. Upon identification or determination of an appropriate affix (e.g., a prefix), the process may then place the stem or remainder portion (e.g., suffix—i.e., prefix complement) of the key into the appropriate sub-cascade and/or provide a recursive comparison and placement process for any remaining affixations within the stem or remaining portion of the key.

When the number of key or stem complementary affixes (e.g., suffices for a given prefix) stored in the cascade exceeds a set (yet; configurable) capacity, other example embodiments further provide for forming a sub-cascade for a given affix (e.g., a prefix, suffix, infix, etc.) within the given cascade. In such case, redistribution, repartitioning or rebalancing of the cascaded indexes, subspaces or affixations as described herein may be needed but, the timing and need of such may also be configurable and/or predefined.

Finally, the values from key-value pairs may be stored into a separate (but potentially similar) structure where they can be cross-referenced with the corresponding keys. In an optional advantageous embodiment, the structures that include keys and/or values may persist on a durable media from which they could be restored upon system restart, e.g. read by parts or as a whole.

When searching for records satisfying a given predicate in a database which was organized into exemplary "cascades" of the present invention, exemplary embodiments advantageously provide for translating the problem into a pattern search problem (PSP) within data organized into "cascades". As such exemplary embodiments provide for successively comparing parts of an identified pattern to corresponding affixes (e.g., prefixes) in "sub-cascades", excluding from further search those sub-cascades whose affixes do not match the corresponding parts of the pattern. If the affix or affixes match a corresponding cascade or sub-cascade, the complementary affixation or remainder (e.g., a stem or suffices in the case of prefixes) of the composite keys in a flat storage are sequentially scanned for matching the remainder of the pattern.

An exemplary process for searching in a database may include receiving a message indicating a query with a filter, where such query comprises a certain predicate (e.g., Boolean expression) and asks for records satisfying that predicate. The predicate may then be converted into a pattern to search for in the keys within the database. Note that the searching for such keys may be performed in a parallel or sequential manner, within each partition representing an instance of a cascade data structure. Next, the process compares appropriate parts of the query pattern to affixes (e.g., prefixes) within the cascade, and may limit subsequent searching to sub-cascades whose affixes (e.g., prefixes) match the mentioned parts of the query pattern. The process further includes scanning, in parallel or sequential manner, the underlying flat storage for matching the remainder of the pattern. Once matches are found, key-value pairs are formed as specified in the query using cross-reference between selected keys and values. Next, the merging or aggregating key-value pairs selected within each partition and conversion of those key-value pairs into original data values (i.e., decoding) may be performed; such that the obtained query result can be transmitted back to the user.

In other words, exemplary embodiments provide databases and other systems and devices (used for storing multidimensional records of information in data warehousing and data analytics applications) with techniques, which transform the record data into key-value pairs using, e.g., dictionaries or transformations and other types of specific key composition techniques. Key-value pairs may then be stored in an index or cascade data structure as previously described. The multidimensional space of possible composite keys may then be parameterized with a space-filling curve, wherein each key corresponds to a point or node on the curve (which generally can be viewed or considered as a very large integer). The cascaded or indexed data structure is designed to organize keys in a way convenient for loading data and querying it, where queries against user data with point, range and/or set predicates (or, filters), on any attribute or any combination of attributes, is translated into a pattern search problem (PSP) on the keys within the index or cascade. Note that such point filters are typically equality restrictions, range filters are generally inequality or interval restrictions, and set filters are usually subset restrictions.

Generally, attributes used in data warehousing and online analytical processing (OLAP) applications are split into two groups, independent and dependent variables, or "dimensions" and "measures" (or "facts"), respectively. More specifically, the separation of the variables into dependent and independent form is done relative to one another, or as part of a relationship, into which they define part of a business process. Other added attributes may further depend on dimensional attributes, inducing a hierarchical structure on the dimensions. Moreover, the same variable (attribute) can participate in many relationships and play different roles in them. For example, if customers are buying products from stores at certain times for certain price and in certain quantities, then we can say that "customer", "product", "store" and "time" are the independent variables (i.e., the primary or driving factors) of the process; whereas "price" and "quantity" are dependent on their relationship with the noted dimensional attributes. This is determined by the functional dependency relationship derived from one's business knowledge: wherein, e.g., the same customer can buy the same product at the same store at the same time only once. In other words, the values of (price, quantity) become a function of (customer, product, store, time); and generally, such dependency becomes part of the business process which produces various data records; however, it may not be the only dependency logically known.

In the above mentioned exemplary data recording or loading process, values of each dimensional attribute are encoded into integers, and these integers can then be used to form a composite key. Dependencies of the dimensional attributes may or may not be included into the noted composite key. Nevertheless, their inclusion may add sparsity to a data set, but it may also eliminate the need for joins at query time. Further, embodiments consider the need for preservation of the ordering of ordered attributes in the encoding process; along with the use of dictionaries and/or transformations used to encode and decode the attributes, since they typically provide constant lookup time.

In accordance with further exemplary embodiments, composition of the composite key may be implemented in the form of mixing the binary digits (bits) of encoded dimensional values into assigned positions. Any subset of positions in a key may be described by a mask. For multidimensional key composition purposes, each attribute participating in a key would typically have an associated mask. As such, different masks do not necessarily share any set positions and their union generally forms the entire set of positions in the composite key. Thus, it is always possible to extract the values of the participating attributes from the composite key.

The resulting parameterization or space-filling curve noted above is called a generalized "z-curve." Generally, such curve visits each point in the space of composite keys only once. FIG. 1 illustrates some of the considered shapes of generalized z-curves 10, 14 for two different mask choices in two-dimensional setting. In FIG. 1, dotted rectangles 12, 16 indicate some of the "subspaces" of the corresponding key space. For example, these subspaces 12, 16 are rectangular areas into which a corresponding z-curve enters only once (and, of course, exists only once). Further, the shape of a given subspace or rectangle is specific to a chosen masks. If a subspace contains $2^n$ points, n is called its order. Each subspace may be uniquely characterized by an integer with N-n bits where N is the total number of bits in the composite key. Further, each point within the subspace includes the same prefix. Accordingly, a mask of any subspace of order n has the leading N-n positions. A different way to group points involves considering a more general affix (not just prefix, but e.g. suffix) which corresponds to other subsets of bits (e.g. trailing bits for a suffix, etc).

In accordance with exemplary embodiments, a search for given pattern of bits in the composite key within a given subspace of order n amounts to splitting the pattern into a part corresponding to the affix (e.g. prefix) mask of the subspace, or affix pattern, and the remaining (e.g., suffix) mask, or complementary affix pattern. Note, however, that one of the affix and/or stem/remaining portion (e.g., prefix and suffix) patterns may be empty (no restriction); yet, if the affix pattern is not empty and the subspace affix does not match, the whole subspace is disqualified from the search. If, on the other hand, the subspace affix matches the affix pattern, and the complementary affix pattern is empty, all points in the subspace are qualified without any additional filtering. Further, if complementary affix pattern is non-empty, the remaining portions of the pattern should be scanned for each point within the subspace. The points whose remaining portion matches the complementary affix pattern are deemed qualified; and thus, they pass the filter and can be added to the query's result.

Accordingly, exemplary embodiments find it advantageous, both mathematically and experimentally, to sequentially search within a subspace when the number of existing points along a space filling curve does not exceed a certain bound, depending also on subspace's order. On the other hand, example embodiments consider it unnecessary to include into the cover subspaces those with too few existing points. The upper and lower bounds for optimal subspace's cardinality may depend on several factors and may have to be established experimentally. Further, such parameters may be configurable either dynamically or statically; and may be predetermined or set based on historical or empirical data.

In brief, exemplary embodiments described herein provide for an index/cascade data structure or mechanism for keeping subspace cardinality within predetermined desired bounds, with a key component of the present invention including an index structure with such properties ("cascade") used in conjunction with a generalized space filling curve (e.g., z-curve), with fixed attribute masks. To describe the cascade/index data structure, reference is made to FIGS. 2-5.

Figure 2:
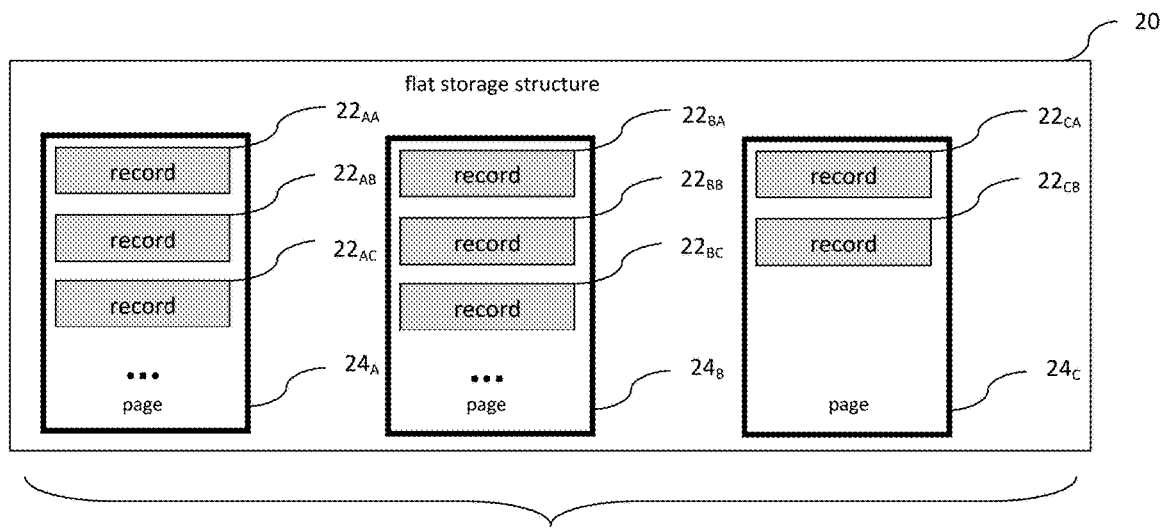
FIG. 2 illustrates a flat storage structure in accordance with exemplary embodiments described herein.

FIG. 2, illustrates an exemplary form of how keys from appropriate subspace could be stored in a "flat storage structure" 20. The records $22_{AA}$, $22_{AB}$, $22_{CB}$) represent suffices of the original composite keys organized in pages ($24_A$, $24_B$, $24_C$) of fixed or predefined (yet configurable) capacity. The page capacity may or may not depend on the suffix (or complementary affix) length (number of bits) and a particular value may be chosen to optimize reads from storage media. The page may also contain the number of records stored in the page, and the flat storage structure may also contain a list of its pages and its total cardinality.

Figure 3:
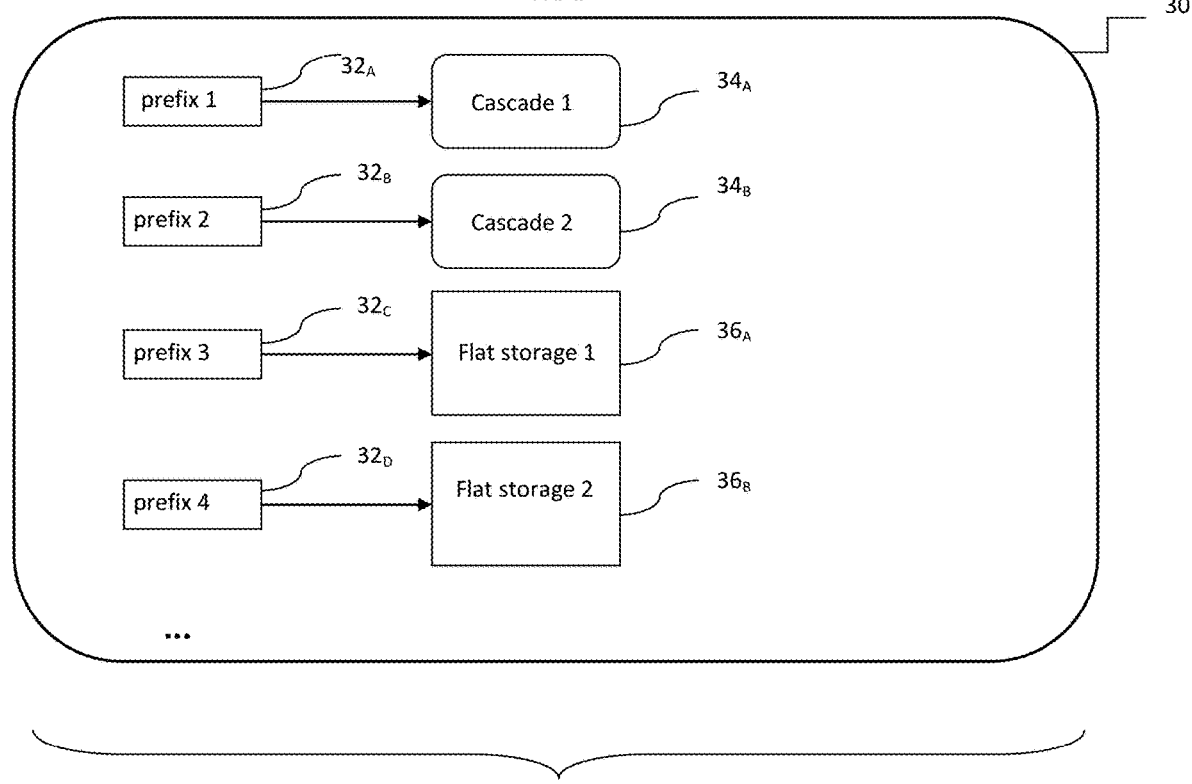
FIG. 3 illustrates a cascade data structure in accordance with exemplary embodiments described herein.

FIG. 3 illustrates the organization of the "cascade" data structure, where such cascade data structure 30 forms a kind of an affix (e.g., prefix) tree (or, trie). Note that the cascade data structure 30 maintains correspondence between affixes such as prefixes, ($32_A$, $32_B$, $32_C$, $32_D$) of the composite keys and sub-structures, which could represent either a flat storages ($36_A$, $36_B$) or a next level ("nested") cascades ($34_A$, $34_B$). This next level ("nested") cascade is, by recursion, structured as 30. Further, note that the size of each affixation ($32_A$, $32_B$, $32_C$, $32_D$) may be customizable; and thus, may vary depending on any number of factors. Further, although they will typically be predefined and uniform in size, other example embodiments consider a more dynamic approach to the formation of such affixes; albeit, some consistency in augmentation is needed for correct addressing purposes.

In accordance with further exemplary embodiments, both flat storage structures and next level ("nested") cascades operate on records that are complementary affixations (e.g., suffixes in the case of prefixes) of the original keys obtained by truncating the corresponding affix (e.g., prefix in the case of suffixes). Such data organization ensures significant compression since only a single copy of the common affix of all records in a sub-structure is stored. The affix length or individual lengths for affixes can be given as a parameter or policy and can vary from level to level. One way to define such affix length parameter is to set it to one byte (i.e. 8 binary digits) for all affixes or complementary affixations; however, other values for this parameter are also considered herein. As such, the use of any particular size for the affixations as used herein is for illustrative purposes only and is not meant to limit or otherwise narrow the scope of the present invention unless otherwise specifically claimed.

The following will give a brief example of conversion of a multidimensional data record into key-value pair according to exemplary embodiments described herein. Like all examples given herein, it is used for illustrative purposes only and may or may not be indicative of any specific use of the present invention. Using the example dimensional attributes and values previously noted, a data record may be split according to dimensional attributes and measures in the form of: (customer, product, store, time), (price, quantity), respectively, may take a more specific instance of, e.g., (Alex, iPhone, Palo Alto, 4/14/2016), (600, 1). Next, exemplary embodiments encode each individual instance of dimensional attributes (i.e., customer and product and so on) into integer form (using a dictionary, for example). More specifically, a dictionary or transformation may specify the following, Alex→3, iPhone→10, Palo Alto→35, 4/14/2016→106. Thus, (Alex, iPhone, Palo Alto, 4/14/2016) can translate into, or gets encoded as, an integer form of (3, 10, 35, 106).

Next, by applying appropriate masks to the encoded integers, embodiments create a composite key out of the encoded individual key values. For instance, a mask that translates integers into binary form may convert the encoded key values of (3, 10, 35, 106)→into a single value, such as 4598 (composition in its binary form). The resulting key-value pair thus becomes→[4598, (600, 1)], which can now be stored as noted above.

Figure 4:
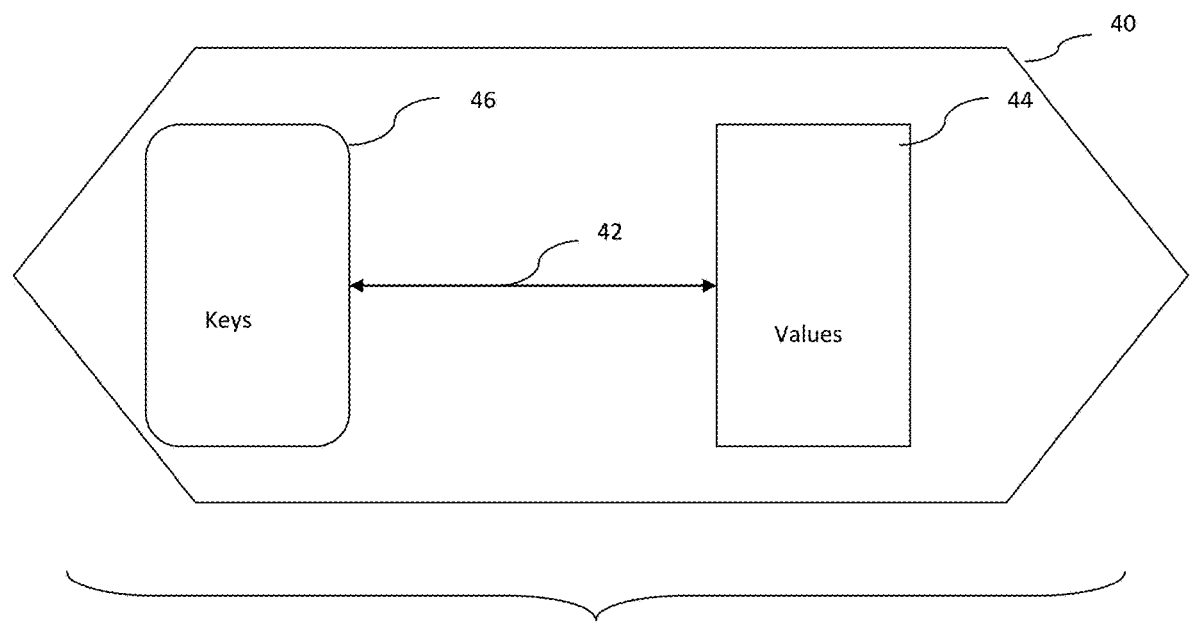
FIG. 4 illustrates a key-value store based on a cascade structure for keys and storage for values in accordance with exemplary embodiments described herein.

FIG. 4 illustrates an example key-value store 40 organization, where keys are stored in a cascade structure 46 and values are stored in a separate structure 44 while bi-directional correspondence 42 is maintained between keys and values. The correspondence should allow for determining which value record corresponds to a given key and vice versa, so that key-value pairs can be retrieved as necessary. An example implementation of such correspondence could consist in keeping with each flat storage a reference to value storage unit, and vice versa, and keeping each suffix (or remaining portion, complementary affixation, etc.) and its corresponding value at the same logical position in the flat storage and value storage or keeping logical position of the value together with the suffix and logical position of the suffix together with the value.

Figure 5:
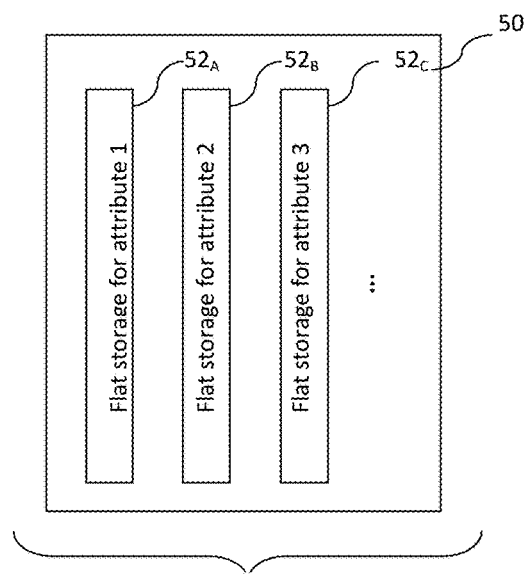
FIG. 5 illustrates storage for values in columnar form in accordance with exemplary embodiments described herein.

Value storage unit could be organized, for example, as a flat storage structure, except that values are not encoded. However it may be more efficient to organize the value storage unit as columnar storage, per attribute. FIG. 5 illustrates possible organization of value storage unit 50 in columnar form whereby for each attribute in the value, a separate flat storage ($52_A$, $52_B$, $52_C$) is organized.

Figure 6:
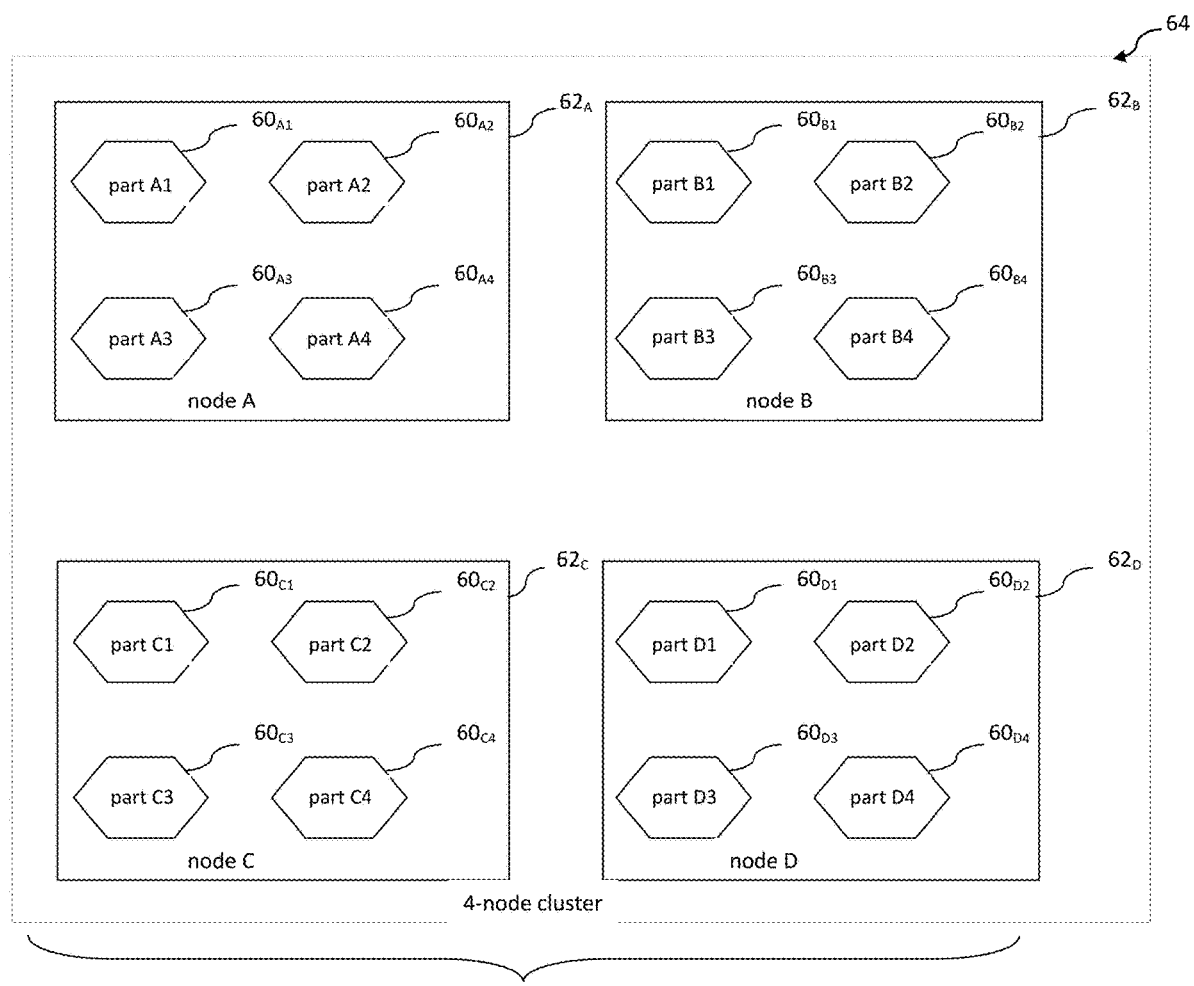
FIG. 6 illustrates partitioning of the key-value storage in accordance with exemplary embodiments described herein.

FIG. 6 illustrates an example partitioning scheme by which a cluster 64 of 4 nodes ($62_A$, $62_B$, $62_C$, $62_D$) receives 4 partitions per node, each of them being a cascade key-value data store ($60_{A1}$, $60_{A2}$, $60_{D4}$). The number of nodes per cluster and partitions per node may be any number suitable for particular hardware and software configuration of each node. The important desired factor in partitioning the records is obtaining even distribution of the number of records across nodes and partitions. For this purpose, different ways of partitioning the data could be employed, for example, round-robin distribution or random distribution or distribution based on generated hash code where the hash code may be generated from the composite key or its parts. The partitioning scheme in no way restricts or enhances current invention as long as it achieves reasonably even distribution.

Figure 7:
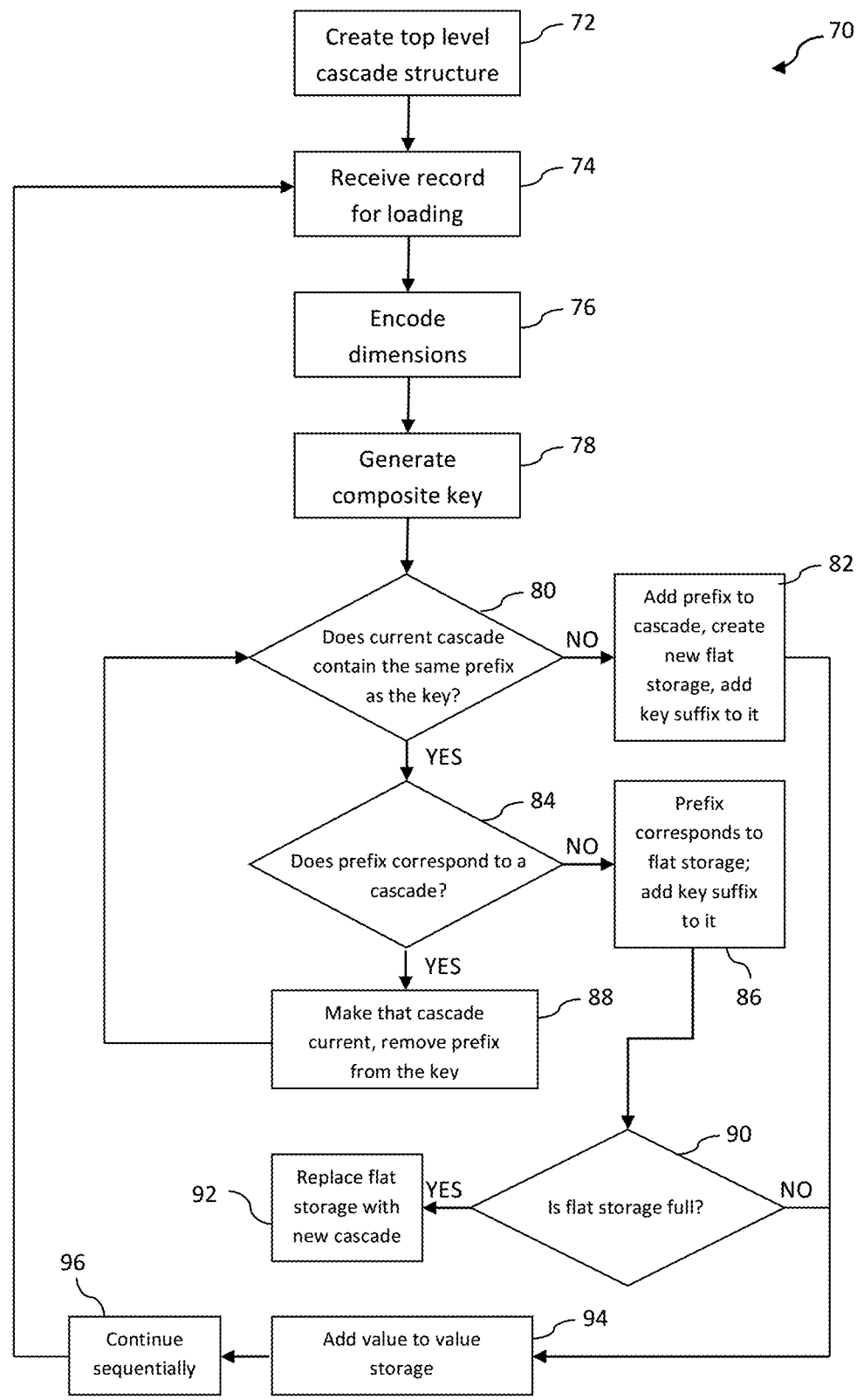
FIG. 7 illustrates a flow diagram for data loading in accordance with exemplary embodiments described herein.

FIG. 7 illustrates flowchart 70 for a method of data loading into a database with cascade index structure. Initially, in step 72 an empty top-level cascade data structure is created. Data dictionaries for all relevant dimensions may be built, with the purpose of transforming each dimensional attribute's values into an integer. Integer-valued dimensions can sometimes be encoded via transformations instead of dictionaries. In any event, encoding for naturally ordered dimensions should preserve order. As previously mentioned, the purpose of data dictionaries and transformations is to encode in step 76 values of dimensional attributes in the record, which is received for loading in step 74.

Next, a composite key is generated in step 78. Accordingly, a mask is generally assigned for every dimension attribute to fix appropriate bit positions in the composite key for that attribute. The purpose of attribute masks is to describe how to generate, from encoded attribute values of the current record, a composite key in step 78. The original data record is thus transformed into key-value form.

Current cascade is originally the cascade created in step 72 which may be empty or contain already some data as a result of loading previous records. Current cascade, as described in FIG. 3, establishes correspondence between prefixes of inserted keys and subordinate structures. For illustration purposes only, in the drawings it is assumed that each prefix has constant length within a cascade. Such assumption is made only for brevity of illustration and in no way restricts or enhances exemplary embodiments of the present invention. In a broader context according to alternative embodiments, prefix sizes per cascade may vary.

In step 80 it is determined whether the current cascade already has the same prefix as the key being inserted. If there is no such prefix, the prefix of the key is added to the current cascade, a new flat storage structure is created as well as a corresponding value storage unit, and a new correspondence is created in the cascade between that prefix and the just created flat storage structure. The suffix of the key (complement of the prefix) is added to the mentioned flat storage structure. All this is shown as step 82 in the flowchart 70. After that, the key-value pair's value is added to the just created value storage unit in step 94. If value storage unit is organized as columnar storage, for example, as in FIG. 5, each component of the value is added to the flat storage structure for appropriate attribute. Step 96 concludes the loop, and the flow returns to step 74 where the next record may be arriving for loading.

Returning to step 80, if it is determined that the current cascade already contains the same prefix as the key, the flow continues to step 84 in determining whether that prefix corresponds to a (next level) cascade or to a flat storage structure. If the prefix corresponds to a flat storage structure, the key suffix is added to it in step 86. In step 90, it is determined whether the flat storage structure has achieved full capacity. If that is not the case, as above, the value is added to value storage in step 94 and the loop concludes in step 96.

If, on the other hand, the flat storage structure is determined to have reached full capacity in step 90, flat storage is restructured into a cascade in step 92. For such restructuring, a new empty cascade is created, and all records from the flat storage space are added to that cascade through step 80 of the flow as already described. Flat storage may be destroyed after all its records have been moved to the new cascade.

If in step 84 it is determined that the current prefix corresponds to a cascade, that cascade is made current cascade, the mentioned prefix is removed from the key in step 88 and the flow returns to step 80, with the appropriate current cascade and appropriate prefix obtained from the just truncated key.

Since sooner or later, by virtue of cascade data structure organization, the flow would come to either step 82 or step 86, the process terminates accordingly.

If key distribution is uniform, the resulting cascade structure is likely to be almost balanced, i.e. all cascade chains would be of approximately the same length. When there are hot spots (relatively dense areas) of the data, however, the cascade data structure could become skewed (unbalanced). But there are also more chances during the query that such areas would be disqualified early in the search, as would become clear from the description of the search process. It is also possible to reduce the depth of the cascade by using variable size prefixes in heavily skewed cases.

Figure 8:
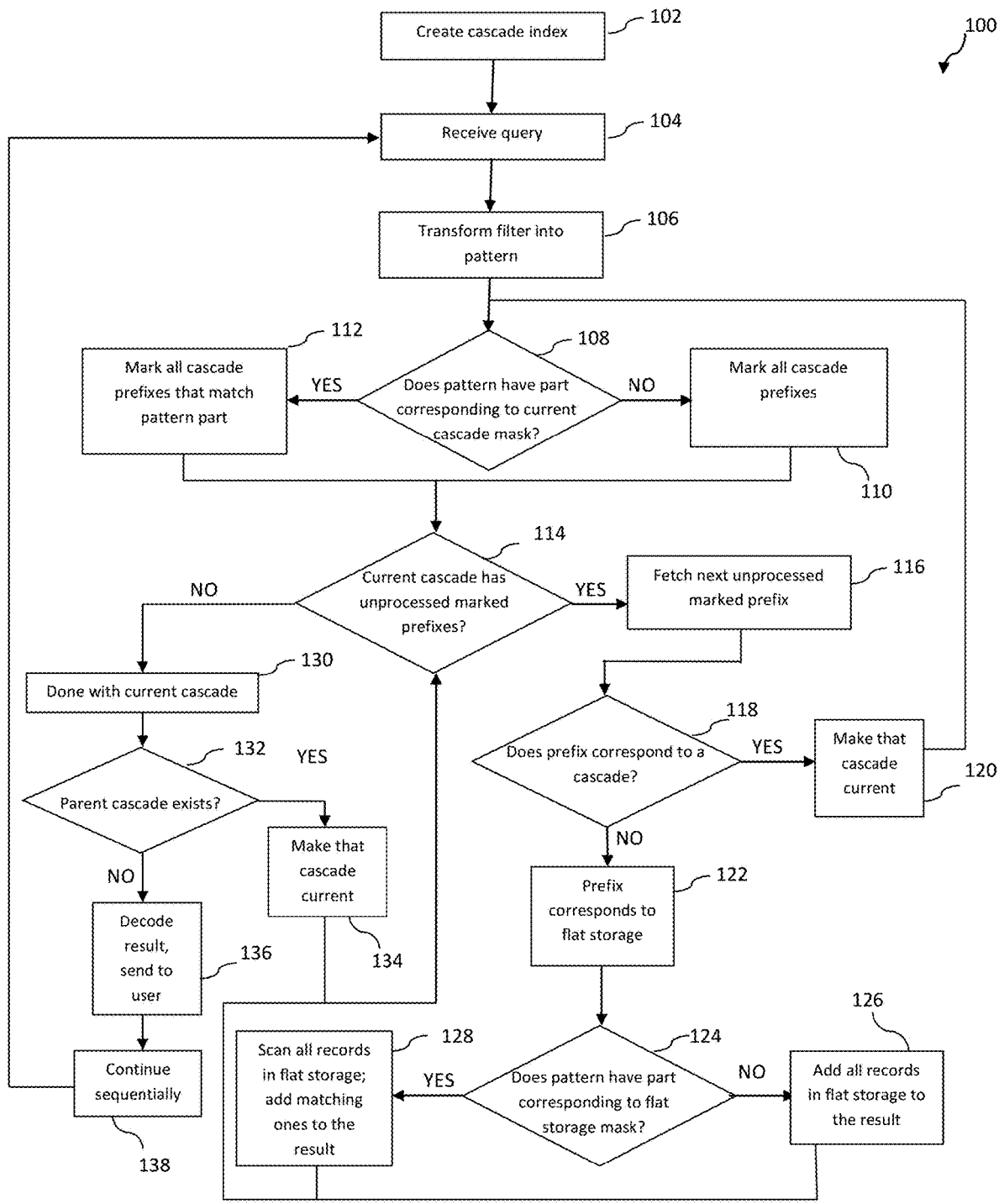
FIG. 8 illustrates a flow diagram for database searching in accordance with exemplary embodiments described herein.

FIG. 8. illustrates flowchart 100 for a method of searching with filters on dimensions within a database with cascade index structure. Initially cascade index is created in step 102. As previously mentioned, dictionaries or transformations are created for each attribute (dimension) participating in the composite key. When a query with a filter on dimensions is received in step 104, processing starts with step 106, transforming the query into a pattern search problem (PSP) using the dictionaries or transformations for appropriate encoding. To solve the PSP, the pattern is split into two parts, e.g., prefix pattern and suffix pattern, according to the prefix mask of the current cascade. Of course, other divisions according to affixes other than prefix/suffix are possible and contemplated herein; and thus, the use of dividing by prefix and suffix is for illustrative purposes only.

Note that at least one of these patterns may be non-empty; and thus, in step 108, it is determined whether the prefix pattern is empty. If it is, in step 110 all prefixes of the current cascade are marked for processing. If, on the other hand, the prefix pattern is not empty, only those prefixes that match the prefix pattern are marked for processing in step 112.

In step 114, it is determined whether there are any prefixes marked for processing that have not been processed yet. If there are such prefixes, the next unprocessed prefix is chosen in step 116. The order in which the next unprocessed prefix is picked may not be important, but sometimes it would be beneficial to give priority to the one corresponding to the highest cardinality next level cascade, and if no cascades correspond to marked prefixes—to the highest cardinality flat storage structure among those corresponding to the marked prefixes.

If it is determined further, in step 118, that the chosen prefix corresponds to a cascade, that cascade is made current and processing, via step 120, returns, at the next level, to step 108. If in step 118 it is determined that the chosen prefix corresponds to a flat storage structure, processing continues with step 122 with that flat storage structure. In step 124 it is determined whether the suffix pattern obtained above is empty. If it is indeed empty, in step 126 all records within the flat storage structure are added to the result. Otherwise, in step 128 a full scan of the flat storage space is performed and the records matching the suffix pattern are added to the result. After completion of either alternative, step 126 or step 128, processing returns to step 114.

If at step 114, there are no marked unprocessed prefixes, processing of the current cascade is complete in step 130. It is then determined in step 132 whether current cascade has a parent cascade. If there is such parent cascade, that parent cascade is made current in step 134, and processing returns to step 114 at the previous level. If there is no parent cascade, search within the cascade is finished. The accumulated result is then decoded in step 136 using the mentioned dictionaries and/or transformations and sent back to the user. Decoding may also be performed in earlier steps of the flowchart, after a particular record is qualified as a PSP solution. The stage in which decoding is performed does not change the essence and spirit of the described invention.

The main loop continues sequentially in step 138, returning to step 104 in anticipation of the next query.

Processing may include distributed processing performed on several nodes in a cluster or on a single node, with one or multiple partitions of the cascade index on each node. A node is a system capable of independently processing data load or queries according to the mentioned flowcharts or similar flowcharts. Such processing system is typically a computer or some other processing unit which may have single or multiple parts such as central processing unit (CPU), memory, mass storage device, network interface, etc, input and output devices, such as keyboard, mouse, display, audio device, touch device, serial interfaces, etc. Any additional or lacking device does not change the nature and spirit of the proposed processing flowcharts. If distributed processing is performed, query results from partitions must be merged, sometimes before the decoding step 136, if some sort of aggregation is required by the query.

While several embodiments have been provided in this disclosure, it should be understood that the disclosed systems and methods might be embodied in many other specific forms without departing from the spirit and scope of the present disclosure. The examples provided herein are to be considered as illustrative and not restrictive, and the intention is not to be limited to the provided details. As an example, various elements or components might be combined, split, or integrated into another system. Additionally certain features may be omitted or not implemented.

Similarly, techniques, systems, subsystems and methods described and illustrated in various embodiments as separate may be combined and integrated with other systems, modules, techniques or methods without departing from the from the scope of present disclosure. Other examples of changes, substitutions and alterations are ascertainable by one skilled in the art and could be made without departing from the spirit and scope disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a database that stores data records, a method for storing multidimensional data into the database, the method comprising:
   receiving a message indicating a data load for one or more data records, wherein at least one of the one or more data records includes one or more values of dimensional attributes and one or more values of measures associated therewith;
   encoding the one or more dimensional attributes of the at least one data record into one or more key values;
   creating a composite key by transforming the one or more key values into one or more predetermined bit positions according to a mask assigned to each of the one or more key values, wherein the created composite key defines a point of a space filling curve;
   using the created composite key and the one or more values of the one or more measure attributes in representing the at least one data record in key-value pair form;
   identifying where to store the one or more values of the key-value pair form by:
      comparing one or more affixes of the composite key with one or more nested cascade structures, and thus locating a flat storage structure associated with those affixes; and
      based on the comparison, removing at least one of the one or more affixes from the key portion of the key-value pair;
      storing the remainder of the key portion into the corresponding flat storage structure-associated with the removed affixes;
      storing the value (measures) of the obtained key-value pair into a value storage unit of the flat storage structure; and
      cross-referencing positions of the composite key in the corresponding flat storage structure and of the (measures) value in the value storage unit.

2. The method of claim 1, further comprising determining a desired capacity of the flat storage structure based on estimated density of the dataset.

3. The method of claim 1, wherein loading of the one or more data records is performed into partitions, each representing an independent cascade storage structure, from one or more sources.

4. The method of claim 3, wherein each partition resides on one of processing nodes in a cluster.

5. The method of claim 1, wherein the encoding of the one or more dimensional attributes of the at least one data record is performed according to one or more dictionaries, one or more transformations, or both, associated with the corresponding dimensional attributes.

6. The method of claim 1, wherein the composite key further includes the one or more values associated with the one or more dimensional attributes.

7. The method of claim 6, wherein the a value (measures) storage unit of the flat storage structure is organized by columns.

8. The method of claim 1, wherein the affixes includes one or more of a prefix, suffix, infix, and circumfix.

9. In a database that stores data records, a method for retrieving searching results of a query against the stored data records, the method comprising:
   receiving a query requesting data related thereto, wherein the query includes one or more filters on one or more dimension attributes associated with the requested data;
   converting attribute values specified in the filters into integers by encoding, thereby converting the one or more filters into a pattern to search for within one or more composite keys;
   performing a search on the one or more composite keys in order to find at least one composite key that satisfies the corresponding pattern within a related cascade data structure, the search further comprising:
      obtaining a mask for one or more affixes associated with one or more of the related cascade data structures;
      using the mask to successively divide the pattern into a plurality of affix patterns and at least one complementary affixation pattern;
      marking one or more affixes for further processing based on matching the one or more affix patterns;
      successively processing the marked one or more affixes and selecting one or more cascade affixes that match a corresponding affix pattern, wherein the selected one or more cascaded affixes then correspond to a result of the query regarding the requested data; and
      logging the result of the query, which includes one or more keys within a flat storage structure corresponding to the complementary affixation pattern.

10. The method of claim 9 further comprising:
    retrieving from a measure value storage unit one or more measure values referenced by the logged one or more keys and forming key-value pairs as requested by the query;
    decomposing one or more keys in key-value pairs into component codes using one or more masks assigned to dimension attributes;
    decoding values of component codes using one or more dictionaries, one or more transformations, or both, and which are assigned to dimension attributes thus converting key-value pairs into user-readable records; and
    transmitting the user-readable records to a user as a query result.

11. The method of claim 10, wherein if the corresponding complementary affixation pattern is empty, all of the keys within the flat storage structure are logged as the query result, and wherein if the corresponding complementary affixation patter is non-empty, only those keys that satisfy the corresponding complementary affixation pattern are logged as the query result.

12. The method of claim 9, wherein the one or more attribute values are converted into integer form using one or more dictionaries, one or more transformations, or both, for encoding them.

13. The method of claim 9, wherein the plurality of affix patterns includes a plurality of prefix patterns and the at least one complementary affixation pattern includes a suffix.

14. The method of claim 9, wherein marking the one or more affixes in case of non-empty affix pattern includes marking a subset of the one or more affixes for further processing; and wherein marking the one or more affixes in the case of an empty affix pattern, includes marking all of the one or more affixes for further processing.

15. The method of claim 9, wherein the successively processing of the marked one or more affixes continues until either no affixes have been marked for further processing or the a flat storage structure within an appropriate cascade is reached.

16. A computer program product comprising computer executable instructions stored on a non-transitory computer readable storage medium for use in a database that stores data records, such that when the computer executable instructions are executed by a processor, they cause the database to:
   receive a message indicating a data load for one or more data records, wherein at least one of the one or more data records includes one or more dimensional attributes and one or more values associated therewith;
   encode the one or more dimensional attributes of the at least one data record into one or more key values;
   create a composite key by transforming the one or more key values into one or more predetermined bit positions according to a mask assigned to each of the one or more key values, wherein the created composite key defines a point of a space filling curve;
   use the created composite key and the one or more values of the one or more measure attributes in representing the at least one data record in key-value pair form;
   identify where to store the one or more values of the key-value pair form by:
      compare one or more affixes of the composite key with one or more nested cascade structures, thus locating a flat storage structure associated with those affixes; and
      based on the comparison, remove at least one of the one or more affixes from the key portion of the key-value pair;
   store the remainder of the key portion into the corresponding flat storage structure associated with the removed affixes;
   store the measures value of the obtained key-value pair into a measure value storage unit of the flat storage structure; and
   cross-reference positions of the key in the corresponding flat storage structure and of the value in the measure value storage unit.

17. The computer program product comprising computer executable instructions stored on the non-transitory computer readable storage medium of claim 16, the computer executable instructions further causing the database to:
   receive a query requesting data related thereto, wherein the query includes one or more filters on one or more dimension attributes associated with the requested data;
   convert attribute values specified in the filters into integers by encoding, thereby converting the one or more filters into a pattern to search for within one or more composite keys;
   perform a search on the one or more composite keys in order to find at least one composite key that satisfies the corresponding pattern within a related cascade data structure, the search further comprising:
      obtain a mask for one or more affixes associated with one or more of the related cascade data structures;
      use the mask to successively divide the pattern into a plurality of affix patterns and at least one complementary affixation pattern;
      mark one or more affixes for further processing based on matching the one or more affix patterns;
      successively process the marked one or more affixes and selecting one or more cascade affixes that match a corresponding affix pattern, wherein the selected one or more cascaded affixes then correspond to a result of the query regarding the requested data; and
      log the result of the query, which includes one or more keys within a flat storage structure corresponding to the complementary affixation pattern.

* * * * *